United States Patent Office 2,979,482
Patented Apr. 11, 1961

2,979,482

ORGANOPOLYSILOXANES STABILIZED WITH FERROCENE AND FERROCENE DERIVATIVES

William A. Piccoli, Pittsburgh, Pa., assignor to Dow Corning Corporation, Midland, Mich., a corporation of Michigan No Drawing. Filed Oct. 15, 1956, Ser. No. 615,764

4 Claims. (Cl. 260—45.75)

This application relates to organopolysiloxane compositions of enhanced thermal stability which contain a ferrocene as the stabilizing agent.

Organopolysiloxane fluids, greases, resins, and rubbers have become well know articles of commerce. They are justifiably noted for their thermal stability, inertness, relatively slight change in physical properties over extremely wide temperature ranges, electrical insulating properties, and the like.

Although the organopolyiloxanes are in general far more thermally stable than their conventional organic counterparts, it has been the desire of the industry to enhance this superiority. A number of additives have been used for this purpose, but generally such additives have had an adverse effect upon one or more of the other desirable properties of these materials.

It is an object of the present invention to provide organopolysiloxane compositions of improved thermal stability and which retain to as great an extent as possible their other desirable properties. More specific objects are for the provision of improved organopolysiloxane fluids, greases, resins, and rubbers.

Accordingly this invention relates specifically to stabilized organopolysiloxane compositions comprising an organopolysiloxane comprised of units of the formula $$R_xSiO_{\frac{4-x}{2}}$$

where R is selected from the group consisting of monovalent hydrocarbon radicals and halogenated monovalent hydrocarbon radicals and $x$ is an integer of from 0 to 3 inclusive, the average value of $x$ in said organopolysiloxane being from 0.5 to 3 inclusive, and from 0.01 to 3.0 percent by weight, based upon the weight of the organopolysiloxane, of a stabilizing agent selected from the group consisting of (1) ferrocene and (2) a substituted ferrocene containing not more than one substituent on either cyclopentadienyl ring therein, said substituent being selected from the group consisting of $$-CH_3, -C_6H_5, -\underset{\underset{O}{\|}}{C}CH_3, -COOH, -\underset{\underset{O}{\|}}{C}CHClCH_3$$

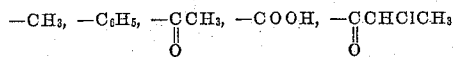

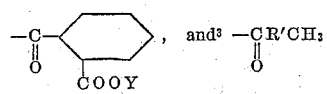

radicals where R' is a divalent alkylene radical of from 1 to 3 inclusive carbon atoms and Y is selected from the group consisting of H atoms and alkyl radicals of from 1 to 18 inclusive carbon atoms.

The ferrocenes defined above are now well known and many are commerically available materials. Ferrocene itself, which is also known as bis(cyclopentadienyl)iron, is considered to have a structure in which the two cyclopentadienyl units form covalent bonds to ferrous iron symmetrically (J.A.C.S. 74, 2125). It has the formula $(C_5H_5)_2Fe$, and since the iron is sandwiched between parallel rings, the structure is represented as:

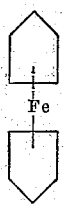

All ring positions in this compound are apparently equivalent, for only single monosubstituted derivatives exist. Since the disubstituted derivatives containing one substituent on each ring do not exhibit any geometrical isomerism, it is considered that the cyclopentadiene rings rotate freely about the central iron atom.

In the substituted ferrocenes which can be used herein, the defined substituents can be attached to one or both cyclopentadienyl rings, but there is only one substituent on a particular ring. Thus both the substituted and unsubstituted compounds can be represented by the formula

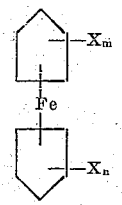

where X is one of the defined substituent radicals and $m$ and $n$ are integers of from 0 to 1 inclusive.

Ferrocene can be prepared by adding $FeCl_3$ to cyclopentadienylmagnesiumbromide, both in tetrahydrofuran as a solvent. As an example of the preparation of the substituted derivatives, ferrocene reacts with acetyl chloride in the presence of $AlCl_3$ to yield the diacetyl derivative. The oxidation of the latter leads to the dicarboxylic acid derivative. Ferrocene reacts with acetic anhydride in the presence of anhydrous HF to produce the monoacetyl derivative, and with phthalic anhydride in the presence of $AlCl_3$ to give bis(o-carboxybenzoyl)ferrocene. When the reactant is B-chloropropionyl chloride instead of the acetyl chloride above, the product is bis(B-chloropropionyl)ferrocene. The phenylferrocenes can be prepared by reacting an acetic acid solution of ferrocene and a diazotized phenylamine. The substituents on the substituted ferrocenes undergo typical organic reactions to provide a wide variety of the predicted products. See J.A.C.S. 74, 3458, 4971, and 5531 (1952).

The organopolysiloxanes which can be stabilized by the addition of from 0.01 to 3.0 percent by weight of the defined ferrocenes include any siloxane which consists essentially of units of the formula $$R_xSiO_{\frac{4-x}{2}}$$

In this formula R can be any monovalent hydrocarbon radical and/or halogenated monovalent hydrocarbon radical and $x$ is 0, 1, 2, or 3. The average value of $x$ in the polymer, however, should be at least 0.5. The R radicals attached to each Si atom can be the same or different radicals, and the same or different radicals can be attached to the various Si atoms in the polymer. Thus the polymer can contain $RSiO_{1.5}$, $R_2SiO$, or $R_3SiO_{.5}$ units singly or in any combination, and $SiO_2$ units can also be present in any combination with such units as long as the average R/Si ratio is at least 0.5.

Examples of suitable R groups include alkyl radicals such as methyl, ethyl, butyl and octadecyl; alkenyl radicals such as vinyl, allyl, and hexenyl; cycloaliphatic hydrocarbon radicals such as cyclohexyl, cyclopentyl and cyclohexenyl; aralkyl hydrocarbon radicals such as benzyl and aromatic hydrocarbon radicals such as phenyl, xenyl, naphthyl, tolyl and xylyl, and any halogenated monovalent hydrocarbon radical such as pentafluoroethyl, 1,1,1-trifluoropropyl, trifluorovinyl, 2,4-dichlorophenyl, bromophenyl, $\alpha,\alpha,\alpha$-trifluorotolyl, tetrafluorocyclobutyl and tetrachloroxenyl.

Because of their generally superior properties, the organopolysiloxanes in which the R groups are methyl, ethyl, phenyl, mono- or dichlorophenyl, or 1,1,1-trifluoropropyl radicals, or a combination of such radicals, are preferred in the practice of this invention. It is also preferred that at least 50 molar percent of the R groups present be of the non-aromatic type.

The described organopolysiloxanes are well known, and a number of those types for which a preference has been stated are commercially available materials. It is to be understood that the siloxanes employed herein can contain not only the defined polymeric units, but can also contain minor amounts of similar units in which the silicon atoms have uncondensed hydroxy groups and/or unhydrolyzed groups such as Cl and alkoxy attached thereto, as is conventional in the commercial products. Uncondensed commercial organosiloxane resins, for example, often contain as much as 3 to 5 weight percent of hydroxy groups, and such materials are within the scope of this invention.

Many organosiloxane polymers also contain typical organic polymeric units therein (e.g. the "silicone-alkyd" resins), or contain functional organic radicals attached to some of the Si atoms therein, or contain cross-linking substituents derived from such functional radicals. Such polymers are extensively described in the literature. It is to be understood that they too are operative and are considered as organopolysiloxanes within the scope of this invention.

The organopolysiloxanes per se assume the form of fluids, resins, or elastomers, depending upon their average degree of substitution (R/Si ratio) and upon the type of R radicals present. An enhanced thermal stability is obtained by adding the defined ferrocenes to these materials themselves. The invention is inclusive, however, of the organopolysiloxane-ferrocene mixtures in which other additives are present. For example, when a grease thickening agent is added to the stabilized fluid, the enhanced stability is carried over into the grease. A host of grease forming agents for the "silicones" are documented in the literature, and suitable examples include metallic salts of fatty acids (U.S. Patents 2,456,642 and 2,599,984) and of alicyclic substituted fatty acids (U.S. Patent 2,551,931), soaps of hydroxy fatty acids (U.S. Patent 2,508,741), lithium salts (U.S. Patent 2,606,153), finely divided metallic oxides such as silica, alumina, and iron oxide (particularly in their aerogel form as described in U.S. Patent 2,428,608), fume silica, calcium carbonate, and carbon black. Any of these or similar agents can be incorporated into the compositions herein.

Likewise, it is conventional to add various fillers such as asbestos, glass fibers, metallic oxides and the like to silicone resins to prepare, e.g., laminates or molding compositions. It is also known that blowing agents can be added to silicone resins to form structural foamed resins. The present invention includes the use of the defined ferrocenes in all of such materials. Also it is not uncommon to incorporate various additives in silicone fluids to improve the lubricity thereof, or to provide greater corrosion resistance. Such additives can be used in conjunction with the ferrocenes to give a more thermally stable product.

Another aspect of this invention lies in the incorporation of ferrocenes into otherwise quite conventional organopolysiloxane rubbers. In such systems, the conventional fillers and additives which are employed to strengthen the rubber or give it special properties can be present. Examples of such materials are amply illustrated in the prior art, e.g. U.S. Patents 2,572,227; 2,571,039; and 2,684,957, and include such diverse inorganic heat stable fillers as $TiO_2$, ZnO, PbO, MgO, $Fe_2O_3$, $Cr_2O_3$, lithopone, talc, calcium silicate, clay, glass fibers, asbestos, and diatomaceous earth. Best results are obtained by employing the so-called "reinforcing silicas" such as fume silica and those silica aerogels which meet the requirements set forth in U.S. Patent 2,541,137. Other conventional additives include the oxides and salts of mercury, the oxide, peroxide, or carbonate of calcium, and zinc peroxide, any of which can be present to enhance properties such as compression set in the final product.

The organosiloxanes in such silicone rubbers, as is well known, preferably consist essentially of the $R_2SiO$ type units. It is also preferred that at least 50 molar percent of the R radicals are alkyl, particularly methyl, or 1,1,1-trifluoropropyl. Any remaining radicals are preferably phenyl, in an amount preferably not exceeding 50 molar percent, or vinyl in an amount not exceeding about 2 molar percent. These siloxanes can be gums which are insoluble in organic solvents, or fluid materials. If the latter are used, preferably their viscosity should not be less than 5,000 cs. at 25° C.

In the preparation of the silicone rubbers within the scope of this invention, the only difference from the conventional and well known techniques lies in the fact that the organic peroxides, which are so often advocated as vulcanization catalysts, are preferably avoided. Either heat alone or other non-peroxy type catalysts, such as boron hydride, sulfuryl chloride, and ferric chloride, can be used to achieve the desired degree of vulcanization. The preferred manner for vulcanizing the rubbers of this invention, however, is that of exposing the compounded mixture to ionizing radiation. This term, as used here and as well understood by the art, refers to beta rays, gamma rays, X-rays, and accelerated electrons, protons, neutrons, deuterons, and alpha particles. Convenient sources of such radiation are atomic piles or nuclear reactors, radioactive isotopes, electron or particle accelerators such as betatrons, cyclotrons, resonant transformers and linear accelerators, and X-ray equipment. A "Van de Graaff generator" has been found to be a most convenient and practical source of such radiation. Appropriate techniques for radiation vulcanization of silicone rubber have been described in the literature, as for example in Belgian Patent No. 520,402, granted June 30, 1953, to the General Electric Company.

The "dose" or energy which must be used to achieve the desired degree of vulcanization varies not only with the type of silicone, filler, and additives present, but also with the depth of material to be treated, and the amount of time which is practical to devote to the radiation of any particular quantity of material. Thus the optimum conditions for each system must be experimentally determined. As an example of the practical considerations involved, it can be noted that $Co^{60}$ is entirely operative herein, but a 1400 curie source required 5 to 10 hours to vulcanize a silica filled dimethylpolysiloxane elastomer. Another example is in the use of X-rays. The commercial tubes are operative but are generally designed to be point sources of X-rays, and do not fan out to cover larger areas readily. Also the efficiency of generation of the radiation is low.

In general it can be said that except for very high level energy electrons or protons, the penetration of these particles is less than that of neutrons or gamma rays. On the other hand, however, in comparing the effects of various forms of radiation of equal energy, the effect per unit volume of material is greater for the electrons or protons. In other words, the ionization effect tends to be concentrated on the surface when protons, electrons, alpha particles or fission fragments are the source of energy, but is distributed through a larger volume of material when neutrons or gamma rays are the source. Thus the type of radiation employed must be chosen not only from the standpoint of economics and availability, but in view of the desired results as well. Considering all aspects of the matter, at the present time the "Van de Graaff generator" seems to be the best source of radiation in the process of this invention. A typical model of this generator provides a 2 m.e.v. electron beam over an area of about 15 cm.$^2$.

A convenient unit for designating the amount of radiation energy employed is the mrep. (megarep.). A "rep." (roentgen equivalent physical) is the amount of radiation energy required to produce an absorption of 83.8 ergs in one gram of water. Most high polymers are very similar to water in their radiation absorption characteristics, so the rep. unit is commonly used in this field. The 2 m.e.v. Van de Graaff generator mentioned above provides about $4 \times 10^6$ rep. per second, or about $1.4 \times 10^{10}$ rep. per hour. Ordinarily the preferred dosage for the vulcanization of the silicone rubbers of this invention is in the region of 3 to 15 mreps. Any temperature above the brittle point of the rubber (which is far below 0° C.) and below its thermal decomposition point can be used during radiation. In general the higher temperatures speed up the vulcanization rate, and it is usual to operate within the range of 20° to 150° C.

As noted above, the ferrocenes can be employed in an amount of from 0.01 to 3.0 percent by weight. Preferably this range is in the region of 0.04 to 1.0 percent. Where no thickener or filler is present the amount is preferably (but not necessarily) within the solubility limits of the siloxane.

Any mechanical means capable of bringing about an intimate and homogeneous dispersion of the ferrocene in the particular mixture can be used. Where gums or greases are involved, the heavier "dough-mixer" or rolling mill type of equipment is suitable, whereas with fluids almost any reasonably fast agitation equipment can be used. When fluids are to be used as such, actual solution of the particular ferrocene in the fluid is of course desirable. Heating the mixture, e.g. to 100° C. or so, usually expedites bringing about such a solution, and a mutual solvent (such as a non-polar organic solvent) can be used if desired. When a true solution is obtained, any solvent present can be removed by distillation or any undissolved ferrocenes can be removed by filtration.

The stabilized compositions of this invention are useful as lubricants, hydraulic fluids, damping fluids, coating compounds, molding compounds, structural resins, electrical insulation, gasketing, sealing compounds and other uses for which organosiloxanes are normally employed.

The following examples are illustrative only.

Example 1

Mixtures were prepared of a trimethylsiloxy endblocked dimethylpolysiloxane fluid having a viscosity of 1,000 cs. at 25° C. and varying amounts of ferrocene (i.e. biscyclopentadienyl iron). A 50 g. sample of each was then placed in a 150 ml. beaker and each sample was openly exposed in an air circulating oven held at 250° C., along with a sample of the pure fluid as a blank. The samples were inspected at frequent intervals for 48 hours to see whether they had gelled, then after that period they were inspected approximately every 24 hours. The amount of ferrocene present, as percent by weight based on the weight of the siloxane fluid, and the time required to gel the particular mixture are shown below.

| Percent ferrocene: | Hours to gel, 250° C. |
|---|---|
| 0 | 31 |
| 0.04 | 115 |
| 0.07 | 390 |
| 0.10 | 403 |
| 0.20 | 1306 |
| 0.29 | 1330 |
| 0.60 | 2256 |

Example 2

Mixtures were prepared containing the siloxane fluid of Example 1 and either 0.66 percent by weight of monoacetylferrocene or 0.55 percent of diacetylferrocene. The latter had a gel time of 2370 hours at 250° C., and the former had not gelled after 3,000 hours at that temperature. When these substituted ferrocenes are replaced in the fluid of Example 1 by 0.5 percent respectively of dimethylferrocene, ferrocene carboxylic acid (i.e. having a —COOH group attached to one ring) or the methyl or 2-ethylhexyl esters thereof, ferrocene dicarboxylic acid or the methyl ester thereof, dipropionylferrocene, bis(b-chloropropionyl)ferrocene, bis(o-carboxybenzoyl)ferrocene or the methyl ester thereof, or a mixture of mono- and diphenylferrocene, a corresponding increase in the thermal stability of the fluid is obtained.

Example 3

Organosiloxane fluids were prepared in which the various polymers were of the indicated types, reference being made to molar percentages of the units in question:

A. 10Me$_3$SiO$_{.5}$, 40Me$_2$SiO, 50PhMeSiO
B. 15Me$_3$SiO$_{.5}$, 80Me$_2$SiO, 5Cl$_2$C$_6$H$_3$SiO$_{1.5}$
C. 10Me$_3$SiO$_{.5}$, 90EtMeSiO
D. 10Me$_3$SiO$_{.5}$, 40Me$_2$SiO, 50(F$_3$CCH$_2$CH$_2$)MeSiO
E. 10PhMe$_2$SiO$_{.5}$, 85Me$_2$SiO, 5(BrC$_6$H$_4$)MeSiO
F. 10Me$_3$SiO$_{.5}$, 80Me$_2$SiO, 10MeSiO$_{1.5}$

For simplicity, the symbols Me, Et, and Ph are used here for methyl, ethyl, and phenyl respectively. These fluids ranged from about 100 to about 10,000 cs. in viscosity at 25° C. Each fluid was heated at 100° C. and rapidly agitated while 0.5 percent by weight of ferrocene was added. The mixture in each case exhibited an enhanced thermal stability, as evidenced by an increased gel time at 250° C., over the original. Sufficient silica was added to each mixture to thicken it to a grease. The greases also exhibited increased thermal stability over their unstabilized counterparts.

Example 4

Resins were prepared containing:

A. MeSiO$_{1.5}$ and PhSiO$_{1.5}$ units
B. MeSiO$_{1.5}$, PhSiO$_{1.5}$, and PhMeSiO units
C. MeSiO$_{1.5}$, PhMeSiO, SiO$_2$, and PhViSiO units
D. MeSiO$_{1.5}$, PhSiO$_{1.5}$, and Ph$_2$SiO units
E. PhSiO$_{1.5}$, PhMeSiO, and ViSiO$_{1.5}$ units
F. F$_3$CCH$_2$CH$_2$SiO$_{1.5}$ and PhMeSiO units The symbol Vi is used above to represent a vinyl radical. These resins were prepared by the cohydrolysis of the corresponding chloro- or ethoxy substituted organosilanes, and had a ratio of R/Si ranging from 0.7 : 1 to 1.8 : 1. One percent by weight of ferrocene, based on the weight of the organosiloxane present, was added to toluene solutions of each, along with 0.05 percent of lead octoate and 0.5 percent of dibutyl tin diacetate as catalysts. When these resins are coated on aluminum panels and cured to a tack-free state of 200° C., an enhanced thermal stability is found in each.

Likewise an improvement in thermal stability is obtained when 0.5 percent ferrocene based on the siloxane is added to a resin consisting of 80 parts of a silicone-alkyd resin and 20 parts of a polyvinyl formal resin, these components having been prepared in accordance with Example 1 of the Kohl U.S. Patent 2,721,854, issued October 25, 1955.

*Example 5*

A series of vulcanizable compounded elastomers was prepared by mixing 100 parts $TiO_2$, 100 parts dimethylpolysiloxane gum, and either 0, 0.5, 1.5, or 3 parts ferrocene on a 3 roll mill. A similar series was prepared differing only in that 35 parts fume silica were used in place of the $TiO_2$. (The "parts" expressed above are all parts by weight.) Each type of compounded elastomer in the above series was then duplicated except that in place of the dimethylpolysiloxane there was employed 100 parts of one of the following polymers:

A. A dimethylpolysiloxane fluid having a viscosity of 30,000 cs. at 25° C.
B. A dimethylpolysiloxane fluid having a viscosity greater than 1,000,000 cs. but still being completely soluble in benzene.
C. A copolymeric benzene-soluble fluid having a viscosity greater than 1,000,000 cs. and consisting essentially of $Me_2SiO$ units and $PhMeSiO$ units in the molar ratio of 9:1.
D. A copolymeric gum consisting essentially of $Me_2SiO$ units and $MeSiO_{1.5}$ units in the molar ratio of 98:2.
E. A copolymeric gum consisting essentially of $Me_2SiO$ units and $MeViSiO$ units in the molar ratio of 98:2.
F. A gum consisting essentially of $(F_3CCH_2CH_2)MeSiO$ units.

These mixtures were sheeted out in a thickness of 0.060 inch, and were then cured to the truly rubbery state by exposing each to a radiation dose of 10 mreps. from a 2 m.e.v. Van de Graaff generator. The stability of the rubber was tested by heating test samples for 2,000 hours at 250° C., then determining the tensile strength thereof. It would found that ferrocene in each case resulted in a higher tensile strength after this prolonged ageing than that exhibited by the corresponding control samples which were free of ferrocene. Within the range of 0.5 to 3 percent ferrocene tested, generally speaking there was a slight decrease in tensile strength with increasing amounts of the ferrocene. In general the percent increase in tensile strength brought about by the presence of ferrocene ranged from about 35 to 50 percent.

That which is claimed is:

1. A stabilized organopolysiloxane composition comprising an organopolysiloxane comprised of units of the formula $$R_xSiO_{\frac{4-x}{2}}$$

where R is selected from the group consisting of monovalent hydrocarbon radicals and halogenated monovalent hydrocarbon radicals and $x$ is an integer of from 0 to 3 inclusive, the average value of $x$ in said organopolysiloxane being from 0.5 to 3 inclusive, and from 0.01 to 3.0 percent by weight, based upon the weight of the organopolysiloxane, of a stabilizing agent selected from the group consisting of (1) ferrocene and (2) a substituted ferrocene containing not more than one substituent on either cyclopentadienyl ring therein, said substituent being selected from the group consisting of

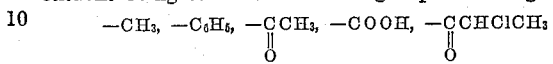

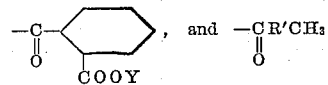

radicals where R' is a divalent alkylene radical of from 1 to 3 inclusive carbon atoms and Y is selected from the group consisting of H atoms and alkyl radicals of from 1 to 18 inclusive carbon atoms.

2. A stabilized organopolysiloxane composition comprising an organopolysiloxane which consists essentially of units of the formula $$R_xSiO_{\frac{4-x}{2}}$$

where R is selected from the group consisting of monovalent hydrocarbon radicals and halogenated monovalent hydrocarbon radicals and $x$ is an integer of from 0 to 3 inclusive, the average value of $x$ in said organopolysiloxane being from 0.5 to 3 inclusive, and from 0.01 to 3.0 percent by weight of ferrocene, based upon the weight of the organopolysiloxane.

3. A stabilized organopolysiloxane comprising a mixture of a trimethylsiloxy end-blocked dimethylpolysiloxane fluid and from 0.01 to 3 percent by weight of ferrocene based upon the weight of said dimethylpolysiloxane.

4. A stabilized organopolysiloxane rubber in which the organosiloxane units consist essentially of $(CH_3)_2SiO$ units and which contains from 0.01 to 3 percent by weight of ferrocene based upon the weight of the organopolysiloxane.

References Cited in the file of this patent

UNITED STATES PATENTS 2,680,756     Pauson     June 8, 1954
2,759,904     Talcott     Aug. 21, 1956

OTHER REFERENCES

Post: "Silicones and Other Organic Silicone Compounds," page 88, 1949, Reinhold Publishing Corporation. (Copy in Scientific Library.)